(12) United States Patent
Chee et al.

(10) Patent No.: US 9,367,430 B1
(45) Date of Patent: *Jun. 14, 2016

(54) DECOMPOSING APPLICATION TOPOLOGY DATA INTO TRANSACTION TRACKING DATA

(71) Applicant: International Business Machines Corporation, Armonk, NY (US)

(72) Inventors: Boon C. Chee, Perth (AU); Scot W. Dixon, Manning (AU); Michelle M. Y. Loffler, Perth (AU); Samuel K. H. Seow, Clarkson (AU); Nicholas Wu, Dianella (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/979,840

(22) Filed: Dec. 28, 2015

Related U.S. Application Data

(63) Continuation of application No. 14/882,654, filed on Oct. 14, 2015.

(51) Int. Cl.
*G06F 9/44* (2006.01)
*G06F 11/00* (2006.01)
*G06F 11/36* (2006.01)

(52) U.S. Cl.
CPC .................. *G06F 11/3668* (2013.01)

(58) Field of Classification Search
CPC ..................................... G06F 11/3668

USPC ............................ 717/120–135; 714/37, 38.1
See application file for complete search history.

(56) References Cited

U.S. PATENT DOCUMENTS

| | | | |
|---|---|---|---|
| 8,549,540 B1* | 10/2013 | Dixon | G06F 9/546 719/314 |
| 8,756,269 B2 | 6/2014 | Dixon et al. | |
| 2010/0296411 A1 | 11/2010 | Chambers | |
| 2012/0151488 A1 | 6/2012 | Arcese et al. | |
| 2013/0179446 A1 | 7/2013 | Dixon et al. | |
| 2013/0305091 A1 | 11/2013 | Stan et al. | |
| 2014/0006606 A1* | 1/2014 | Dixon | G06F 9/546 709/224 |
| 2014/0108646 A1 | 4/2014 | Cheung et al. | |

OTHER PUBLICATIONS

"Cisco Info Center Monitoring"; Cicso; © 2010 Cisco; pp. 1-5.
U.S. Appl. No. 14/882,654, filed Oct. 14, 2015, Entitled "Decomposing Application Topology Data Into Transaction Tracking Data".
List of IBM Patents or Patent Applications Treated As Related, dated Jan. 21, 2016, 2 pages.

* cited by examiner

*Primary Examiner* — Qing Chen
(74) *Attorney, Agent, or Firm* — Edward J. Wixted, III

(57) ABSTRACT

In an approach for generating transaction tracking data that is used to simulate a customer environment or test case scenario, a processor receives user input data, wherein the user input data includes, at least, an application topology constructed using a graphical user interface. A processor validates the user input data for, at least, supported environments of components of the application topology. A processor generates transaction tracking data based on, at least, the user input data.

1 Claim, 3 Drawing Sheets

DECOMPOSING APPLICATION TOPOLOGY DATA INTO TRANSACTION TRACKING DATA

BACKGROUND

The present invention relates generally to the field of transaction tracking, and more particularly to generating transaction tracking data that is used to simulate a customer environment or test case scenario.

Transaction tracking technologies focus on tracking composite applications across multiple technologies, protocols, domains (middleware stacks), and operating systems. Tracking is often achieved by instrumenting targeted software with tracking agents that generate tracking events at strategic points in the application flow. Collected tracking events can be analyzed to determine application metrics and topology.

Application software (i.e., an application) is a set of computer programs designed to permit a user to perform a group of coordinated functions, tasks, or activities. Application software is dependent on system software to execute. Examples of an application include, but are not limited to: a word processor, a spreadsheet design and management system, a console game, or a library management system.

SUMMARY

Aspects of an embodiment of the present invention disclose a method, computer program product, and computing system for generating transaction tracking data that is used to simulate a customer environment or test case scenario. A processor receives user input data, wherein the user input data includes, at least, an application topology constructed using a graphical user interface. A processor validates the user input data for, at least, supported environments of components of the application topology. A processor generates transaction tracking data based on, at least, the user input data.

DETAILED DESCRIPTION

Embodiments of the present invention recognize that with the current state of developing transaction tracking technologies, one of the challenges is to drive test transactions across the diversity of environments that support composite applications. The environments may include multiple operating systems, middleware stacks, and application support technologies, and the environments are linked together by network technologies and communication protocols.

Embodiments of the present invention recognize that developing a large repository of test applications or scripts that drive individual transactions in targeted environments is labor intensive and does not guarantee full coverage, e.g., where scenarios may be missed and transaction paths may be untested. Embodiments of the present invention recognize that it is often necessary or helpful for a sales staff to simulate customer environments to provide demonstrations of transaction tracking capabilities.

Embodiments of the present invention provide features including, but not limited to: (1) simplifying the process for generating test data for testing transaction tracking software across composite applications; (2) reducing the effort required to configure test environments for testing transaction tracking software across composite applications; (3) expanding test coverage for transaction tracking software across composite applications; (4) introducing flexibility into the test environment; and (5) allowing sales and other customers facing personnel to simulate complex customer environments and demonstrate transaction tracking capabilities.

Embodiments of the present invention propose an efficient solution to the problem of generating valid and complex transaction tracking data for test purposes, including volume tests. Embodiments of the present invention also solve the problem of validating customer environments to determine whether transaction tracking is supportable, where supportable means when: (1) transaction tracking data collectors are available for the customer environment, (2) the customer network protocols can be monitored, and (3) the customer's potential transaction volume can be processed efficiently. Unlike traditional test harnesses and automated testware that drive transaction loads into middleware and applications from external clients, embodiments of the present invention propose generating test/simulation data from a graphical user interface. Embodiments of the present invention detail a program that can be used to generate transaction tracking data that is used to simulate a customer environment or test case scenario.

Embodiments of the present invention will now be described in detail with reference to the Figures.

Figure 1:
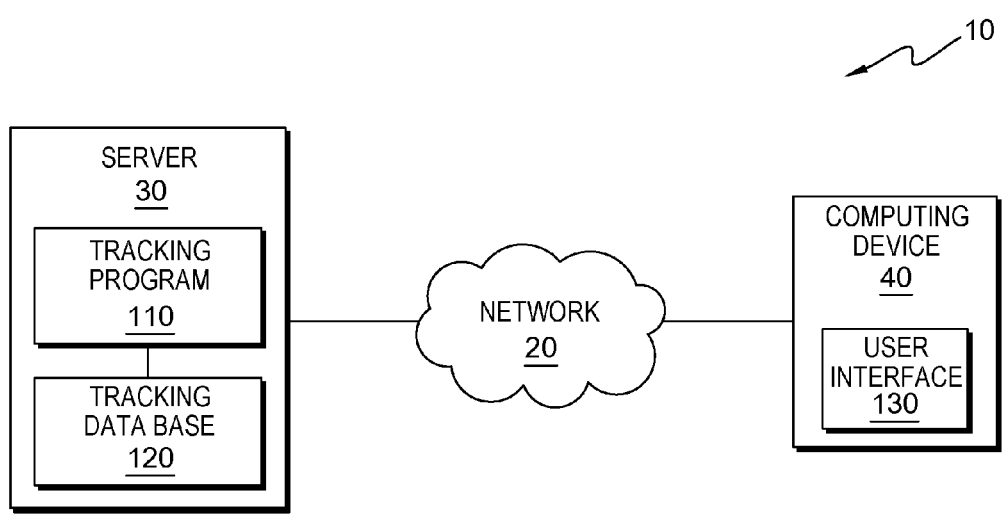
FIG. 1 depicts a block diagram of a computing system, in accordance with an embodiment of the present invention.

FIG. 1 depicts a block diagram of computing system 10, in accordance with one embodiment of the present invention. FIG. 1 provides an illustration of one embodiment and does not imply any limitations with regard to the environments in which different embodiments may be implemented.

In the depicted embodiment, computing system 10 includes server 30 and computing device 40 interconnected over network 20. Network 20 may be a local area network (LAN), a wide area network (WAN) such as the Internet, a cellular data network, any combination thereof, or any combination of connections and protocols that will support communications between server 30 and computing device 40, in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of processing program instructions and receiving and sending data. In some embodiments, server 30 may be a laptop computer, tablet computer, netbook computer, personal computer (PC), a desktop computer, or any programmable electronic device capable of communicating with computing device 40 via network 20. In other embodiments, server 30 may represent a server computing system utilizing multiple computers as a server system, such as in a cloud computing environment. In another embodiment, server 30 represents a computing system utilizing clustered computers and components to act as a single pool of seamless resources. In the depicted embodiment, server 30 contains tracking program 110 and tracking database 120. In other embodiments, server 30 may include other components, as depicted and described in further detail with respect to FIG. 3.

Computing device 40 may be a desktop computer, laptop computer, netbook computer, or tablet computer. In general, computing device 40 may be any electronic device or computing system capable of processing program instructions, sending and receiving data, and communicating with server 30 via network 20. In the depicted embodiment, computing device 40 contains user interface 130. In other embodiments, computing device 40 may include other components, as depicted and described in further detail with respect to FIG. 3.

Tracking program 110 generates transaction tracking data that is used to simulate a customer environment or test case scenario. In doing so, tracking program 110 receives user input data. Tracking program 110 validates user input data. Tracking program 110 generates transaction tracking data. In the depicted embodiment, tracking program 110 resides on server 30. In other embodiments, tracking program 110 may reside on another server or another computing device, provided that tracking program 110 can access tracking database 120 and user interface 130 via network 20.

Tracking database 120 may be a repository that may be written to and/or read by tracking program 110. In some embodiments, a program (not shown) may allow an administrator or other user to define an application topology and store the application topology to tracking database 120. In other embodiments, tracking database 120 may store already determined application topologies. In the depicted embodiment, tracking database 120 resides on server 30. In other embodiments, tracking database 120 may reside on another server or another computing device, provided that tracking database 120 is accessible to tracking program 110 via network 20.

User interface 130 may be any user interface used to access information from server 30, such as information gathered or produced by tracking program 110. Additionally, user interface 130 may be any user interface used to supply information to server 30, such as information gathered by a user to be used by tracking program 110. In some embodiments, user interface 130 may be a generic web browser used to retrieve, present, and negotiate information resources from the Internet. In other embodiments, user interface 130 may be a software program or application that enables a user at computing device 40 to access server 30 over network 20. In other embodiments, user interface 130 is a graphical user interface. In the depicted embodiment, user interface 130 resides on computing device 40. In other embodiments, user interface 130, or similar user interfaces, may reside on another computing device or another server, provided that user interface 130 is accessible to tracking program 110.

Figure 2:
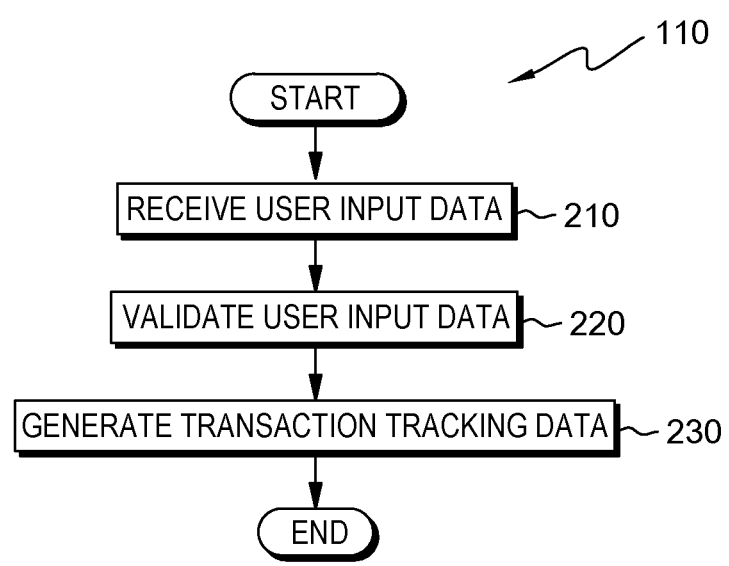
FIG. 2 depicts a flowchart of the steps of a tracking program, executing within the computing system of FIG. 1, for generating transaction tracking data that is used to simulate a customer environment or test case scenario, in accordance with an embodiment of the present invention.

FIG. 2 depicts a flowchart of the steps of a tracking program, executing within the computing system of FIG. 1, in accordance with an embodiment of the present invention. Tracking program 110 generates transaction tracking data that is used to simulate a customer environment or test case scenario.

Initially, user interface 130 allows a user to construct an application topology graph of any kind and of any complexity. The topology represents an application environment to be tested or validated. The topology includes nodes and edges drawn on a workspace. User interface 130 allows the user to assign properties to the nodes that describe the node's operating system, middleware, applications, and other attributes, such as: context (node description) data, status information, volume and timing data into the graphical nodes, with the ability to join the nodes via unidirectional or bidirectional edges. User interface 130 allows the user to construct edges that represent transaction flows between the nodes and assign properties to the edges, including protocols supported between the nodes and direction of flow. User interface 130 allows the user to specify transaction volumes and response times on nodes across edges. Timing data can also be inferred from the position of the nodes on user interface 130 (e.g., time increases from left to right or top to bottom based on a scaled grid).

Nodes can represent different customer systems, applications, middleware, or transactions. Nodes can be configured to include context data that describes the node (e.g., system name, application name, or transaction name). Nodes can be configured to include status information to simulate a live customer environment (e.g., a transaction may have a status of "failed"). Nodes and edges can be configured to include timing information.

In step 210, tracking program 110 receives user input data. The user input data includes the application topology graph created by the user. In one embodiment, tracking program 110 retrieves the user input data from computing device 40 through user interface 130. In some embodiments, a program (not shown) on computing device 40 sends the user input data to tracking program 110. In other embodiments, as the user inputs data into user interface 130, the user input data is automatically sent to tracking program 110. In some embodiments, tracking program 110 stores the user input data to tracking database 120.

In step 220, tracking program 110 validates user input data. In one embodiment, tracking program 110 validates the nodes on the topology for supported environments, operating systems, middleware, and other attributes. In some embodiments, tracking program 110 validates the edges for supported protocols. In other embodiments, tracking program 110 validates the nodes and the edges. Still, in some embodiments, tracking program 110 creates nodes and edges during the validation process. In other embodiments, tracking program 110 stores the validated user input data to tracking database 120.

In step 230, tracking program 110 generates transaction tracking data. Tracking program 110 generates transaction tracking data in multiple formats and varying volumes, based on the topology created in user interface 130. The volume attributes are used to indicate how many transaction tracking events should be generated. In one embodiment, tracking program 110 decomposes the nodes into transaction tracking vertical correlation data, context data, status information, and timing data. For each node, tracking program 110 generates started and finished events with the specified context and timestamps reflecting user configured values. In some embodiments, tracking program 110 decomposes the edges into transaction tracking inbound and outbound events with the specified context and timestamps that are correlated to the source nodes and destination nodes using horizontal correlation data. Additionally, multiple transaction tracking events may be generated for each node and edge, based on user input to user interface 130. Multiple transaction tracking events can be time shifted to simulate a live customer environment.

Figure 3:
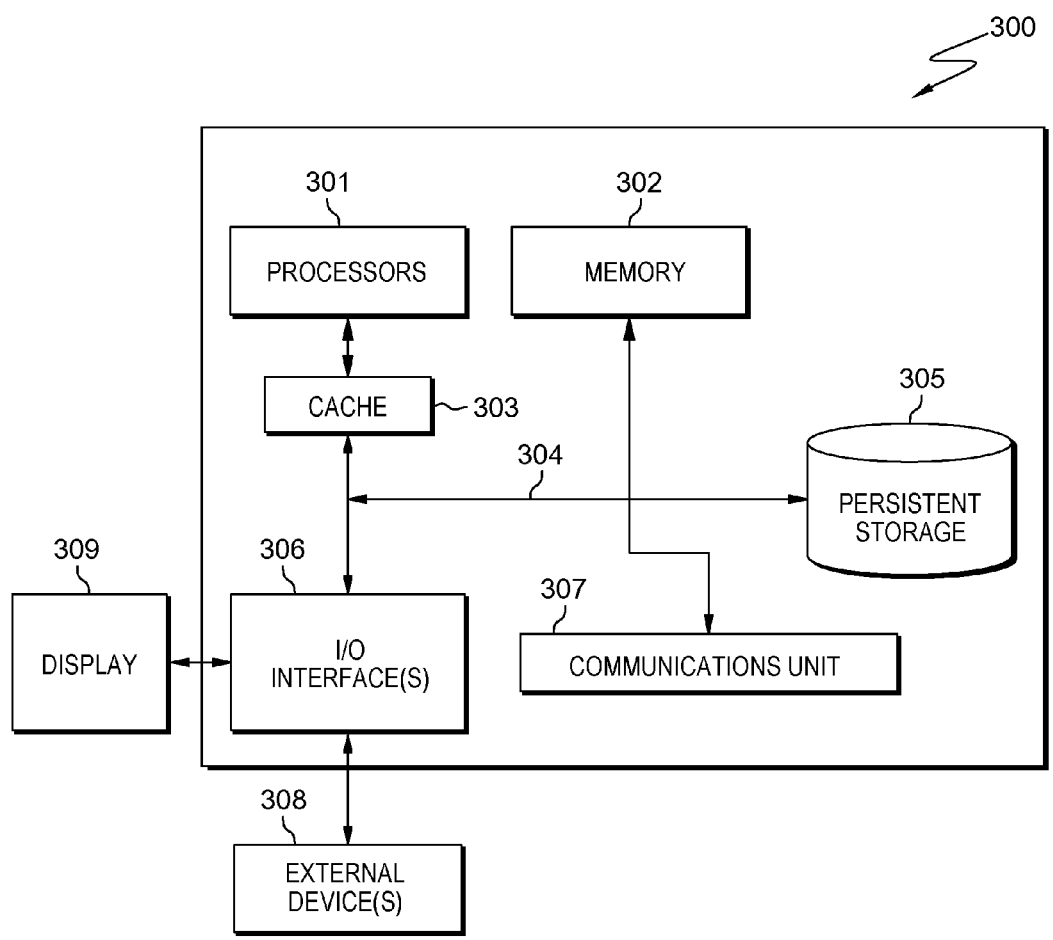
FIG. 3 depicts a block diagram of components of the server and/or the computing device of FIG. 1, in accordance with an embodiment of the present invention.

FIG. 3 depicts computer system 300, which is an example of a system, such as server 30 and/or computing device 40. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307. Tracking program 110 and tracking database 120 may be downloaded to persistent storage 305 of server 30 through communications unit 307 of server 30. User interface 130 may be downloaded to persistent storage 305 of computing device 40 through communications unit 307 of computing device 40.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., tracking program 110 and tracking database 120, can be stored on such portable computer readable storage media and can be loaded onto persistent storage 305 of server 30 via I/O interface(s) 306 of server 30. Software and data used to practice embodiments of the present invention, e.g., user interface 130, can be stored on such portable computer readable storage media and can be loaded onto persistent storage 305 of computing device 40 via I/O interface(s) 306 of computing device 40. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating transaction tracking data that is used to simulate a customer environment or a test case scenario, the method comprising:

receiving, by one or more processors, user input data, wherein the user input data includes, at least, an application topology constructed using a graphical user interface, wherein the application topology represents an application environment to be tested, and wherein the application topology includes nodes that are connected by edges;

validating, by one or more processors, the user input data for, at least, supported environments of components of the application topology, wherein each of the nodes are assigned properties that describe node attributes of the respective node, wherein the node attributes are selected from the group consisting of operating systems, middleware, and applications, wherein each of the edges are assigned properties that describe edge attributes of the respective edge, and wherein the edge attributes are supported protocols for transaction flow between the nodes; and generating, by one or more processors, transaction tracking data based on, at least, the user input data, wherein generating transaction tracking data comprises decomposing the nodes into transaction tracking vertical correlation data, context data, status information, and timing data and generating, for each node, started events and finished events with specified context and timestamps reflecting the user input data, and wherein generating transaction tracking data comprises decomposing the edges into transaction tracking inbound events and outbound events with specified context and timestamps that are correlated to source nodes and destination nodes using horizontal correlation data.

* * * * *